Aug. 27, 1963 J. A. WESTPHAL 3,101,547
APPARATUS FOR DETERMINING THE COORDINATES OF A POINT
Filed May 31, 1961
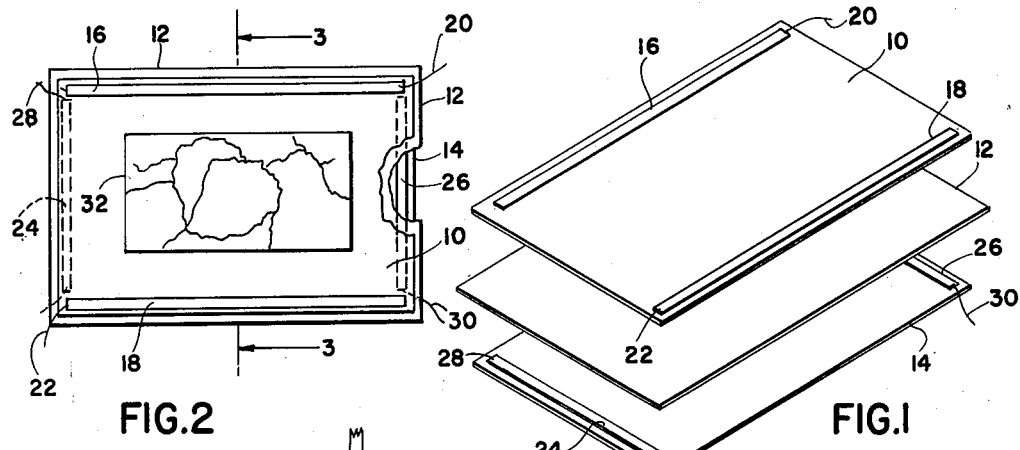
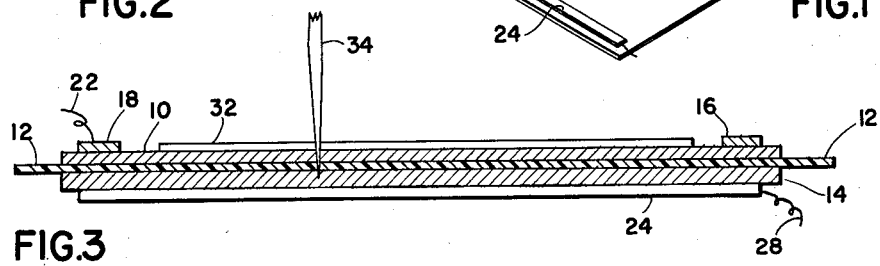
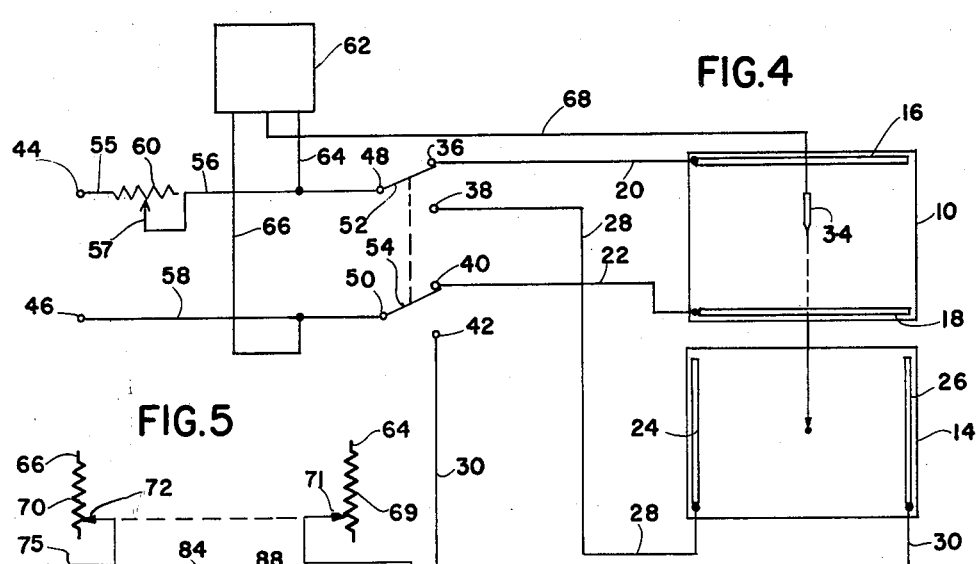
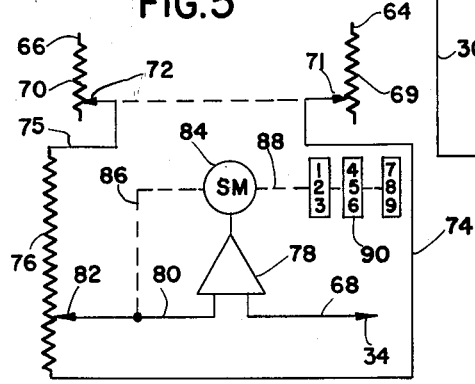
*INVENTOR.*
JAMES A. WESTPHAL
BY
Adams, Forward & McLean
ATTORNEYS

United States Patent Office 3,101,547
Patented Aug. 27, 1963

3,101,547
APPARATUS FOR DETERMINING THE COORDI-
NATES OF A POINT
James A. Westphal, Owasso, Okla., assignor, by mesne
assignments, to Sinclair Research, Inc., New York,
N.Y., a corporation of Delaware
Filed May 31, 1961, Ser. No. 113,919
4 Claims. (Cl. 33—1)

My invention relates to the analysis of graphical data and in particular, provides a device for aiding in the measurement of the coordinates of a point on a two dimensional graph and a method for using such a device.

The coordinates of a point on a two dimensional graph can be determined by a number of well-known graphical methods. Thus, the minimum and maximum points of a trace on a graphical record and the intersection of the trace with datum lines can be determined with a minimum of effort. So also can the position of points on a map be readily determined by the use of such well-known graphical techniques as intersection and resection. While these methods of positioning a point possess a great degree of accuracy, they do not yield an absolute location of the point's position but rather yield, at best, a relative location of the point. This is not to say that the absolute location of such a point cannot be determined, in fact a variety of mathematical, algebraic and geometrical processes have been known to the art for centuries. These processes, however, are dependent upon the mental operations of a skilled operator. Furthermore, such mental processes while not being extremely difficult are none the less time consuming. Various mechanical devices, such as calibrated scales, have been suggested as a means of determining the absolute location of a point on a graph. Again, the operation of such mechanical devices is also time consuming and while they do not require the high degree of skill on the part of the operator necessary for the mental processes mentioned above, the results yielded by such devices are inherently more inaccurate than those of the mental processes. Moreover, the results obtained by such mechanical devices are subject to the interpretation of the operator. Thus, the previous methods and techniques known in the art have failed to provide a simple and rapid means for determining the location of a point on a two dimensional graph that does not require the mental assistance of a skilled operator.

It is an object of my invention to provide a device which can be employed to determine rapidly and simply the coordinates of a point on a two dimensional graph.

It is also an object to provide a method for the employment of such a device.

These and other objects of my invention are essentially achieved by means of a flat electrically-energized support for the map, chart or other graph to be analyzed. The support basically includes a pair of electrically conductive sheets between which a sheet of insulating material is interposed. Each of the electrically conductive sheets corresponds to a different one of the coordinates of the graph in question and is electrically energized such that the electrical potential gradient over the area of the sheet will be a function of the coordinate to which the particular sheet corresponds. Thus, typically each sheet is provided with a pair of elongated spaced apart electrodes having substantially negligible resistance in comparison with the resistivity of the material of which the sheet is constructed and which are preferably parallel and located adjacent a pair of opposite marginal edges of the sheet where the coordinates in question have linear scales. The two conductive sheets are oriented with respect to each other such that the electrodes on one sheet extend in a direction transverse to the electrodes on the other sheet, typically perpendicular in the case of cartesian coordinates. Thus, as the electrodes on a sheet have a potential applied to them the potential will be distributed across the sheet in a manner dictated by the electrodes. It is evident that the relative orientation of the two electrically conductive sheets is thus dictated by the axes of the coordinate system involved.

In utilizing the device, i.e. support, the two dimensional graph in question is super-imposed on the surface of the support with the coordinate axes of the graph aligned with reference to the electrodes of the conductive sheets.

The point on one of the conductive sheets underlying the point on the graph being considered is contacted with an electrically conductive probe and then a voltage is impressed across the electrodes of such sheet. The point on the other conductive sheet underlying the point on the graph being considered is contacted with an electrically conductive probe and then a voltage is impressed across the electrodes of that sheet. One coordinate of the point on the graph being considered is thus indicated by the potential at the point at which the electrically conductive probe is in contact with one of the conductive sheets, and the other coordinate of the point on the graph being considered is indicated by the potential at the point at which the electrically conductive probe is in contact with the other conductive sheet.

Thus, when the graph or map being considered employs cartesian coordinates it will be understood that the opposite marginal edges of the electrically conductive sheets and the electrodes attached thereto are preferably disposed parallel to each other and that the two electrically conductive sheets are positioned in relation to each other so that the marginal edges and electrodes of the two sheets are perpendicular. In such situations the graph or map is positioned so that the axis of one co-ordinate of the graph is parallel to one pair of electrodes while the axis of the other coordinate of the graph is parallel to the other pair of the electrodes. When the point on the conductive sheet underlying the point on the graph being considered is contacted with the electrically conductive probe and the voltage is applied to each of the conductive sheets it can be seen that the potential at the particular contacted points will indicate the ordinate and abscissa of the particular point on the graph being considered. It will also be understood that my invention can readily be adapted so as to operate when considering graphs employing a logarithmic scale simply by disposing the electrodes in contact with a conductive sheet such that the separation between the electrodes varies logarithmically.

It is contemplated that the device of my invention can also have the means for impressing a voltage across the electrode means associated with such device, as well as having such voltage impressing means separate from such device.

To understand more clearly the device of my invention reference is made to the attached drawing in which:

FIGURE 1 is an exploded isometric view of the major elements of an embodiment of my invention.

FIGURE 2 is a plan view of the assembled elements of the embodiment shown in FIGURE 1.

FIGURE 3 is an enlarged sectional view of the embodiment taken along the line 3—3 of FIGURE 2.

FIGURE 4 is a schematic diagram showing the electrical circuit employed with the illustrated embodiment of my invention.

FIGURE 5 is a schematic diagram representing the circuiting of the proportional volt meter shown in FIGURE 4.

FIGURE 1 shows a rectangular conducting sheet 10, a rectangular non-conducting sheet 12 and a rectangular conducting sheet 14. The rectangular non-conducting sheet 12 is of greater overall dimension than conducting sheets 10 and 14 and is shown intermediate sheets 10 and 14. Positioned parallel to each other and located along opposite longitudinal edges of conducting sheet 10 are electrodes 16 and 18. Connected to electrodes 16 and 18 at diagonally opposite corners of conducting sheet 10 are electrical leads 20 and 22, respectively. Positioned parallel to each other and located along opposite lateral edges of conducting sheet 14 are electrodes 24 and 26. Connected to electrodes 24 and 26 at diagonally opposite corners of conducting sheet 14 are electrical leads 28 and 30, respectively. Electrodes 18, 20, 24 and 26 are preferably silver foil and are cemented to their respective sheets 10 and 14 using high conductivity cement.

FIGURE 2 shows conducting sheets 10 and 14 and non-conducting sheet 12 positioned in the preferred relationship to each other to be used in the method of my invention. As can be seen, the conducting sheets 10 and 14 are positioned so that their longitudinal and lateral edges are aligned with each other. Non-conducting sheet 12 is positioned intermediate conducting sheets 10 and 14 and extends beyond the perimeter of sheets 10 and 14 in all directions, thereby insulating conducting sheets 10 and 14 from each other. When positioned in such a manner, the electrodes 16 and 18 of sheet 10 are perpendicular to the electrodes 24 and 26 of sheet 14. The relative positioning of the members of the device of my invention is more clearly illustrated by referring to the cutaway portion at the right side of FIGURE 2 where conducting sheet 14, electrode 26, non-conducting sheet 12 and conducting sheet 10 are shown. Also shown in FIGURE 2 is a cartesian coordinate map 32 overlying the upper surface of conducting sheet 10.

FIGURE 3 is a sectional view showing the vertical relationship of the members of the device of my invention. The specific members shown are: conducting sheet 10, non-conducting sheet 12, conducting sheet 14, electrodes 16 and 18, electrical lead 22, electrode 24 and electrical lead 28. As can be seen, conducting sheets 10 and 14 and non-conducting sheet 12 are parallel to each other with sheet 12 sandwiched between sheets 10 and 14. The perpendicular relationship between electrode 24 of sheet 14 and electrodes 16 and 18 of sheet 10 can also be seen.

The map 32 is shown overlying the upper surface of conducting sheet 10 and an electrically conductive probe 34 is illustrated in contact with a point on the map 32 and the points on sheets 10 and 14 underlying such point on map 32.

In FIGURE 4 can be seen a schematic representation of conducting sheets 10 and 14 with their corresponding electrodes 16, 18, 24 and 26. Four electrical contacts 36, 38, 40 and 42 are also shown. Electrical leads 20, 28, 22 and 30 from electrodes 16, 24, 18 and 26, respectively, are connected to electrical contacts 36, 38, 40 and 42, respectively. The positive and negative terminals 44 and 46, respectively, of a D.C. power source are provided. A mechanically ganged double throw-double pole switch consisting of terminals 48 and 50 and respective switch arms 52 and 54 is also provided.

Electrical line 55 is connected to the positive terminal 44 of the power supply and terminates in a slide wire resistor 60. Electrical line 56 is connected to switch terminal 48 at one end and is provided with a movable electrical contact 57 at the other end. Contact 57 is slidably connected to resistor 60 thereby providing an electrical connection between positive terminal 44 and switch terminal 48 by means of electrical line 55, resistor 60, electrical contact 57 and electrical line 56. The purpose of this arrangement is to provide a means for controlling the voltage applied to the conducting sheets 10 and 14. Thus, the applied voltage can be adjusted as required by the resistance of the particular conducting sheets employed.

Electrical line 58 connects negative terminal 46 with switch terminal 50 and a proportional volt meter 62 is connected to the electrical lines 56 and 58 by means of electrical lines 64 and 66, respectively. Also connected to proportional volt meter 64 is probe 34 by means of electrical line 68. The arms 52 and 54 of the double throw-double pole switch are shown in contact with electrical contacts 36 and 40, respectively.

In FIGURE 5 can be seen electrical lines 64, 66 and 68 and probe 34 which are also illustrated in FIGURE 4. Both electrical lines 64 and 66 terminate in slide wire type resistors 69 and 70, respectively. Resistor 69 is provided with a movable electrical contact 71 which in turn is connected to one end of slide wire resistance 76 by means of electrical line 74. Resistor 70 is similarly provided with a movable electrical contact 72 which in turn is connected to the other end of slide wire 76 by means of electrical line 75. As shown in this figure, electrical contacts 71 and 72 are mechanically ganged. The particular mechanical linkage employed is such that contacts 71 and 72 will move in opposite directions along resistors 69 and 70, respectively.

Electrical line 68 is connected to one terminal of amplifier 78. The other terminal of amplifier 78 is connected to electrical contact 82 by means of electrical line 80. Electrical contact 82 is movable so as to contact slide wire 76 at any point throughout its length. The output of amplifier 78 is connected to a servo-mechanism 84. The mechanical output of servo-mechanism 84 is transmitted by mechanical linkages 86 and 88. Mechanical linkage 86 is connected to electrical contact 82 along slide wire 76 so as to balance the bridge circuit established between the two portions of slide wire resistance 76 on either side of electrical contact 82 and the two portions of the rectangular conducting sheet between the parallel electrodes on either side of probe 34. Mechanical linkage 88 moves similarly to mechanical linkage 86; however, rather than being connected to an electrical contact, such as 82, it is connected to a counter 90. Thus, as servo-mechanism 84 operates mechanical linkage 86 to move electrical contact 82 along slide wire resistance 76 it also operates mechanical linkage 88 such that the relative displacement of electrical contact 82 is indicated on counter 90.

In operation, a graph or map 32 is positioned on the upper surface of rectangular conducting sheet 10 as shown in FIGURE 2. The axis of abscissas of map 32 is positioned parallel to electrodes 16 and 18 while the axis of ordinates of map 32 is positioned parallel to electrodes 24 and 26. Prior to taking any readings the proportional voltmeter is adjusted by means of moving the mechanically ganged contacts 71 and 72. First, the probe 34 is placed in contact with the origin of the coordinate system on the graph or map 32 and the underlying conducting sheets; next, voltage is applied to the electrodes of a conducting sheet; and then contacts 71 and 72 are moved in opposite directions along resistors 69 and 70, respectively, so as to balance the bridge thereby obtaining a zero reading for the origin. The probe 34 is then inserted at the point on the surface of map 32 being considered. The probe is extended such that electrical contact between the probe and rectangular conducting sheets 10 and 14 is obtained. The double throw-double pole switch is then thrown to one of its two positions, for example, as shown in FIGURE 4 having switch arms 52 and 54, respectively, in contact with electrical contacts 36 and 40. Thus, the potential at terminals 44 and 46 is imposed across electrodes 16 and 18 and conducting sheet 10. The difference in potential existing between the electrodes and probe 34 is then measured by proportional volt meter 62. It will be understood that since the difference in potential measured by volt meter 62 is proportional to the distance of probe 34 from the axis of abscissas, once the proportional volt meter 62 has functioned to balance itself, the value indicated on counter 90 will be the ordinate of the point of contact between probe 34 and rectangular conducting sheet 10 which underlies the point on map 32 being considered. The double throw-double pole switch is then thrown to its other position such that switch arms 52 and 54 are now in contact with electrical contacts 38 and 42, respectively. The potential across terminals 44 and 46 is now imposed across electrodes 24 and 26 of rectangular conducting sheet 14. As explained above, proportional volt meter 62 measures the difference in potential between the electrodes and probe 34 which is in contact with rectangular conducting sheet 14. Again the servo-mechanism 84 drives the electrical contact 82 to the balance position and thus displacement is indicated on counter 90.

Thus, it can be seen that through the operation of the embodiment of my invention illustrated in the drawing the ordinate and abscissa of a point on a graph or map are indicated on the dial of a counter and are obtained by the employment of completely mechanical steps.

I claim:

1. An apparatus for determining the coordinates of a point on a two dimensional graph which comprises a first sheet composed of an electrically conductive material, a second sheet composed of an electrically conductive material, and an insulating sheet of greater dimension than said first sheet and said second sheet composed of an electrically non-conductive material, said insulating sheet disposed between said first sheet and said second sheet thereby insulating said first sheet from said second sheet, said first sheet, said second sheet and said insulating sheet disposed parallel to each other, said first sheet having two electrode means positioned in spaced-apart relationship and in contact with said first sheet, said second sheet having two electrode means positioned in spaced-apart relationship and in contact with said second sheet, means for impressing a voltage across the electrode means in contact with said first sheet, means for impressing a voltage across the electrode means in contact with said second sheet, said first sheet and said second sheet having substantially greater electrical resistance than the electrode means in contact therewith, said first sheet and said second sheet positioned in relation to each other such that said electrode means in contact with said first sheet are transverse to said electrode means in contact with said second sheet.

2. An apparatus for determining the coordinates of a point on a two dimensional graph which comprises a first sheet composed of an electrically conductive material having a pair of opposite marginal edges disposed parallel to each other, a second sheet composed of an electrically conductive material having a pair of opposite marginal edges disposed parallel to each other, and an insulating sheet of greater dimension than said first sheet and said second sheet composed of an electrically non-conductive material, said insulating sheet disposed between said first sheet and said second sheet thereby insulating said first sheet from said second sheet, said first sheet, said second sheet and said insulating sheet disposed parallel to each other, said first sheet having electrode means positioned along and in contact with each of said pair of parallel opposite marginal edges, said second sheet having electrode means positioned along and in contact with each of said pair of parallel opposite marginal edges, means for impressing a voltage across the electrode means in contact with said marginal edges of said first sheet, means for impressing a voltage across the electrode means in contact with said marginal edges of said second sheet, said first sheet and said second sheet having a substantially greater electrical resistance than the electrode means in contact therewith, and said first sheet and said second sheet positioned in relation to each other such that said pair of marginal edges of said first sheet is perpendicular to said pair of marginal edges of said second sheet.

3. An article of manufacture for use in determining the coordinates of a point on a two dimensional graph which comprises a first sheet composed of an electrically conductive material having a pair of opposite marginal edges disposed parallel to each other, a second sheet composed of an electrically conductive material having a pair of opposite marginal edges disposed parallel to each other, and an insulating sheet of greater dimension than said first sheet and said second sheet composed of an electrically non-conductive material, said insulating sheet disposed between said first sheet and said second sheet thereby insulating said first sheet from said second sheet, said first sheet, said second sheet and said insulating sheet disposed parallel to each other, said first sheet having electrode means positioned along and in contact with each of said pair of parallel opposite marginal edges, said second sheet having electrode means positioned along and in contact with each of said pair of parallel opposite marginal edges, said first sheet and said second sheet having a substantially greater electrical resistance than the electrode means in contact therewith, and said first sheet and said second sheet positioned in relation to each other such that said pair of marginal edges of said first sheet is perpendicular to said pair of marginal edges of said second sheet.

4. A method for determining the coordinates of a point on a two dimensional graph which includes super-imposing said graph on an outer surface of an article which comprises a first sheet composed of an electrically conductive material having a pair of opposite marginal edges disposed parallel to each other, a second sheet composed of an electrically conductive material having a pair of opposite marginal edges disposed parallel to each other, and an insulating sheet of greater dimension than said first sheet and said second sheet composed of an electrically non-conductive material, said insulating sheet disposed between said first sheet and said second sheet thereby insulating said first sheet from said second sheet, said first sheet, and said second sheet and said insulating sheet disposed parallel to each other, said first sheet having electrode means positioned along and in contact with each of said pair of parallel opposite marginal edges, said second sheet having electrode means positioned along and in contact with each of said pair of parallel opposite marginal edges, said first sheet and said second sheet having a substantially greater electrical resistance than the electrode means in contact therewith, and said first sheet and said second sheet positioned in relation to each other such that said pair of marginal edges of said first sheet is perpendicular to said pair of marginal edges of said second sheet, positioning said graph such that the axis of abscissas of said graph is parallel to the said parallel opposite marginal edges of one of said conductive sheets and the axis of ordinates of said graph is parallel to the said parallel opposite marginal edges of the other of said conductive sheets, contacting the point on said one of said sheets underlying the point on said graph being considered with an electrically conductive probe, impressing a voltage across the electrode means in contact with the parallel opposite marginal edges of said first sheet, contacting the point on said other of said sheets underlying the point on said graph being considered with an electrically conductive probe, impressing a voltage across the electrode means in contact with the parallel opposite marginal edges of said second sheet; whereby the ordinate of the point on said graph being considered is indicated by the potential of the electrically conductive probe in contact with said one of said conductive sheets and the abscissa of the point on said graph being considered is indicated by the potential at the electrically conductive probe in contact with said other of said conductive sheets.

No references cited.